(12) United States Patent
Hosamane et al.

(10) Patent No.: US 11,693,779 B2
(45) Date of Patent: Jul. 4, 2023

(54) PREFETCH OF RANDOM DATA USING APPLICATION TAGS

(71) Applicant: International Business Machines Corporation, Armonk, NY (US)

(72) Inventors: Raghavendra Preetham Hosamane, Bangalore (IN); Janani Swaminathan, Bangalore (IN); Trinadhachari Kosuru, Bangalore (IN); Anil Bindu Lingambudi, Bangalore (IN); Navya Chaitanya Gogula, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 17/245,760

(22) Filed: Apr. 30, 2021

(65) Prior Publication Data
US 2022/0350743 A1 Nov. 3, 2022

(51) Int. Cl.
*G06F 12/0862* (2016.01)
*G06F 12/02* (2006.01)
*G06F 12/0895* (2016.01)

(52) U.S. Cl.
CPC ...... *G06F 12/0862* (2013.01); *G06F 12/0246* (2013.01); *G06F 12/0292* (2013.01); *G06F 12/0895* (2013.01); *G06F 2212/6022* (2013.01); *G06F 2212/6028* (2013.01); *G06F 2212/7201* (2013.01)

(58) Field of Classification Search
None
See application file for complete search history.

(56) References Cited

U.S. PATENT DOCUMENTS

| | | |
|---|---|---|
| 5,666,505 A | 9/1997 | Bailey |
| 7,386,679 B2 | 6/2008 | Franaszek |
| 7,493,453 B2 | 2/2009 | Franaszek |
| 8,516,226 B1 | 8/2013 | Collard |
| 8,656,112 B2 | 2/2014 | Cain, III |
| 10,120,808 B2 | 11/2018 | Kiss |
| 10,474,577 B2 | 11/2019 | Gschwind |
| 10,896,136 B2 | 1/2021 | Bae |
| 2012/0054436 A1* | 3/2012 | Duvvuru ............ G06F 12/0862 711/E12.001 |
| 2019/0102291 A1* | 4/2019 | Zhou .................... G06F 3/0659 |
| 2020/0004685 A1 | 1/2020 | Guim |
| 2020/0401440 A1 | 12/2020 | Sankaran |

OTHER PUBLICATIONS

Jeong et al. "Improving Flash Storage Performance by Caching Address Mapping Table in Host Memory." Jul. 2017. USENIX. HotStorage '17.*
Chance Christopher Coats. Reducing Memory Persistency Overheads with Transparent Out-of-Place Updates. 2019. University of Illinois Thesis.*
Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Nathan Sadler
(74) *Attorney, Agent, or Firm* — Jared L. Montanaro (57) ABSTRACT

A processor may boot a system. The processor may determine a type of operation of data based on an application tag. The processor may analyze at least one specific table for the application tag. The processor may perform an operation associated with the application tag.

20 Claims, 7 Drawing Sheets

PREFETCH OF RANDOM DATA USING APPLICATION TAGS

BACKGROUND

The present disclosure relates generally to the field of computing performance, and more specifically to prefetching random data using application tags.

For any memory system, prefetch of random data is not efficient, as it is difficult to understand a distribution of the data. This particularly affects software configuration management (SCM) as non-volatile memory (NVM) is not as fast as dynamic random-access memory (DRAM); and where memory systems bridge the gap in their performance difference with DRAM by prefetching for sequential operation, the memory systems show definitive lack in performance during random operations.

SUMMARY

Embodiments of the present disclosure include a method, system, and computer program for prefetching random data using application tags. A processor may boot a system. The processor may determine a type of operation of data based on an application tag. The processor may analyze at least one specific table for the application tag. The processor may perform an operation associated with the application tag.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing performance, and more specifically to prefetching random data using application tags. For any memory system, prefetch of random data is not efficient, as it is difficult to understand a distribution of the data. This particularly affects SCM as NVM is not as fast as DRAM; and where memory systems bridge the gap in their performance difference with DRAM by prefetching for sequential operation, the memory systems show definitive lack in performance during random operations.

Accordingly, propose herein are solutions to speed up random access with a prefetch of data to cache using application tags. Shared throughout this disclosure are solutions for write and read operations, which could be further enhanced or optimized by known/existing solutions.

As a summary of what will be discussed in more detail throughout this disclosure, it is noted that any NVM needs to use a translation table to allow a physical to logical address translation. Further noted is the concept of page and block in NVM, but organization of said page and block varies among memory types. Accordingly, it is assumed that all operations are allowed at page level and all pages are organized into blocks.

Proposed herein is a modification to the address translation table by adding two new columns: a block ID column and an application(app)-tag column. Further proposed is the addition of a new lookup table primarily used for write operations called BAT (block to application tag table), which can be a separate table from the translation table and/or only be mapped to/from the block ID column and the app-tag column (e.g., the BAT table would primarily have only the block ID and the app-tag mapped to it).

As discussed herein, every process or thread can be made to be associated to an app-tag at an operating system level; it is noted that the methodology to provide app-tag already exists in Linux. However, at present this app-tag methodology is not made use of at the memory/storage level. Thus, proposed is a way to make use of this app-tag to organize data storage as well as to make operations faster for SCM.

Figure 1A:
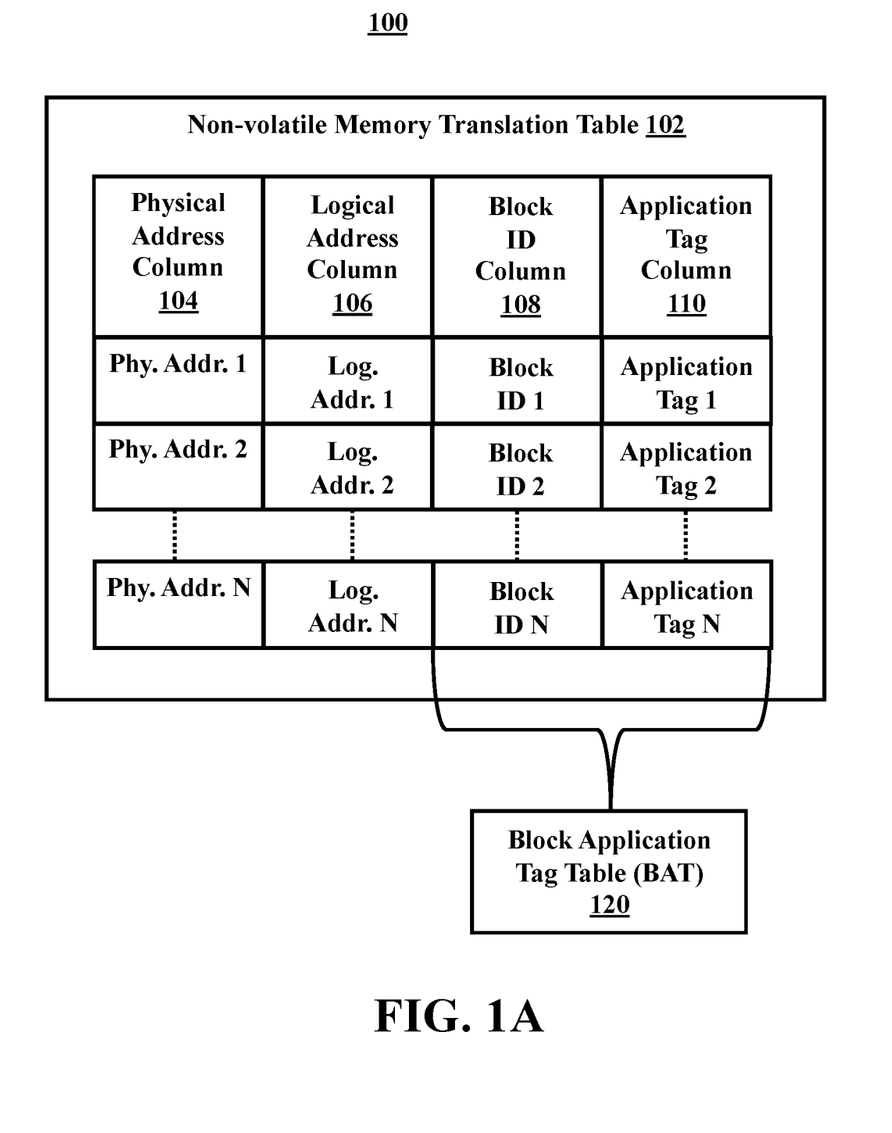
FIG. 1A illustrates a block diagram of an example NVM translation table with added blocks, in accordance with embodiments of the present disclosure.

Turning now to FIG. 1A, illustrated is a block diagram 100 of an example NVM translation table 102 with added blocks (e.g., block ID 108 and application tag 110 columns), in accordance with embodiments of the present disclosure. As disclosed, the NVM translation table 102, which is part of any NVM is modified to have two additional columns (e.g., block ID column 108 and application tag column 110) along with the physical address 104 and logical address 106 mappings/columns. These two additional columns are: the application tag column 110, which holds app-tags associated with physical addresses (in physical address column 104); and the block ID column 108, which holds the address of a block in which the physical address is placed.

In some embodiments, a new table called BAT 120 (block to app tag mapping table) is generated. The BAT 120 primarily holds/is made-up of two columns, e.g., the block ID column 108 and the application tag column 110.

Figure 1B:
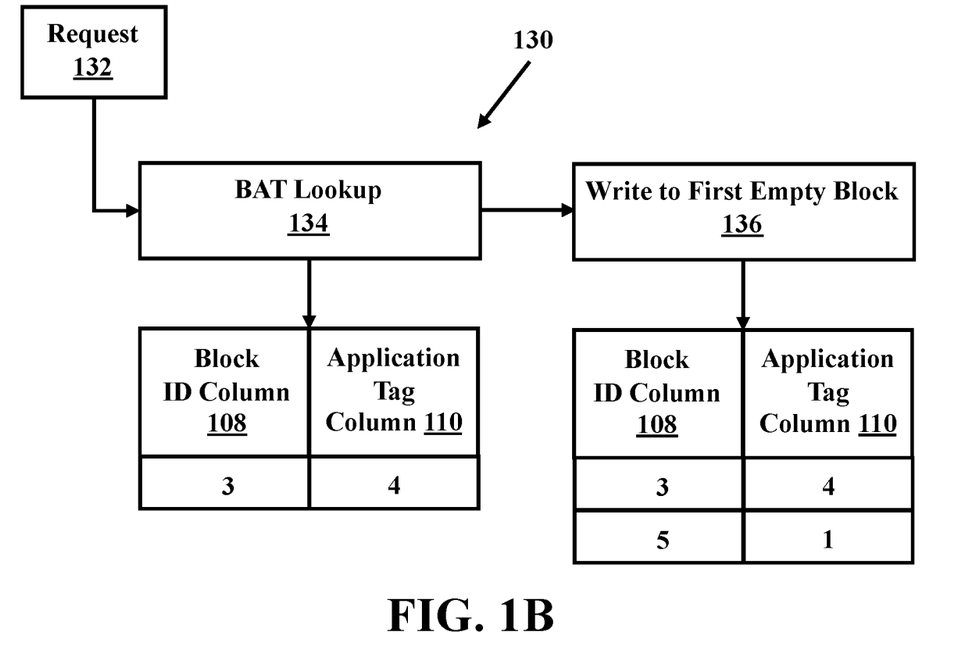
FIG. 1B illustrates a block diagram of a first write to a block, in accordance with embodiments of the present disclosure.

Turning now to FIG. 1B, illustrated is a block diagram 130 of a first write to a block, in accordance with embodiments of the present disclosure. It is noted that like reference numerals are used to designate like parts in the accompanying drawings.

In some embodiments, a request 132 for a write application is received by a controller (not shown) and during the write operation the controller performs a BAT lookup 134, where it checks the BAT 120, e.g., the block ID column 108 and the application tag column 110. If an entry exists for the application tag (e.g., app-tag 1) in the BAT 120, then the controller attempts to write to the block associated with that app tag in the BAT 120.

As depicted however, there is no entry for app-tag 1 and the controller finds a first empty block (e.g., block 5) that can be completely associated to the app-tag (e.g., app-tag 1). If the first empty block is found, the controller writes to the first empty block 136.

Figure 1C:
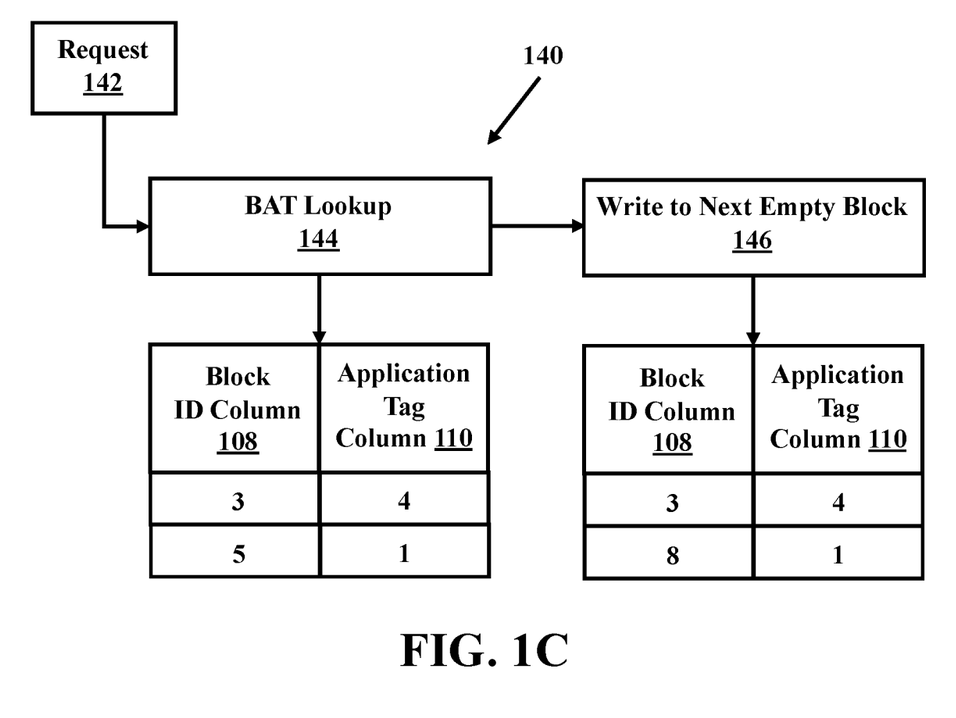
FIG. 1C illustrates a block diagram of an attempted write to a full block, in accordance with embodiments of the present disclosure.

Looking at FIG. 1C, illustrated is a block diagram 140 of an attempted write to a full block, in accordance with embodiments of the present disclosure.

In some embodiments, a request 142 for a write application is received by a controller and during the write operation the controller perform a BAT lookup 144 and identifies an associated app-tag 1, however when attempting to write post BAT lookup 144, the controller finds that the block is now full (e.g., block 5 is already full). The controller then attempts to find a first empty block that can be completely associated to the app-tag. If an empty block is not available, the controller finds/identifies a non-full block close to the last block associated with the app-tag and attempts a write.

In another embodiment, the controller identifies a next empty block (block 8) and writes to the next empty block 146 and then updates the BAT 120 with the associated block ID and app-tag.

It is noted that for read operations, that during a read operation the controller first does a lookup of the requested logical address to obtain the physical address, block ID, and app-tag associated with the address. The controller then prefetches all the data (up-to a prefetch buffer size) that are present in the same block and are of the same app-tag. In the case where there is no additional data of a same app-tag in the same block, but the app-tags exist in other blocks, those closest in logical address are prefetched and placed in the buffer.

Figure 2A:
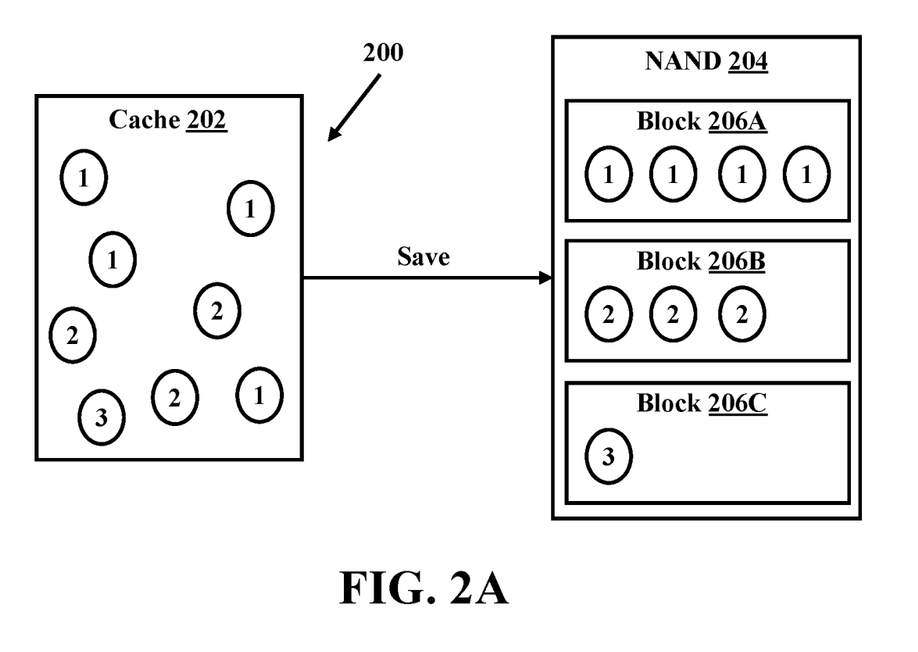
FIG. 2A illustrates an example of a save to a non-volatile memory, in accordance with embodiments of the present disclosure.

Turning now to FIG. 2A, illustrated is an example of a save 200 to a non-volatile memory (e.g., as depicted but in no way limiting, NAND 204), in accordance with embodiments of the present disclosure. As depicted, a cache 202 has a random assortment/placement of tags (e.g., tags 1, 2, and 3) associated with read/write operations. The cache 202 is then saved to the NAND 204 with each specific tag being placed and/or grouped with a particular block 206A-C. In such an embodiment, a subsequent operation can more efficiently (e.g., faster) be performed if an operation with a same tag has already been recorded/saved in the NAND 204.

In some embodiments, while saving app-tags to NVM (e.g., NAND 204), app-tags per unique block 206A-C are used. Each block 206A-C comprises 'n' pages and write/read actions per page. In some embodiments, if NVM (e.g., NAND 204) has X number of blocks, there can be X number of app-tags (e.g., 3 blocks for 3 app-tags, etc.). In some embodiments, for any new X+1 app-tag, a flash translation layer can be used, and a custom addressing scheme to allocate X+1 app-tag to a new block can be utilized.

Figure 2B:
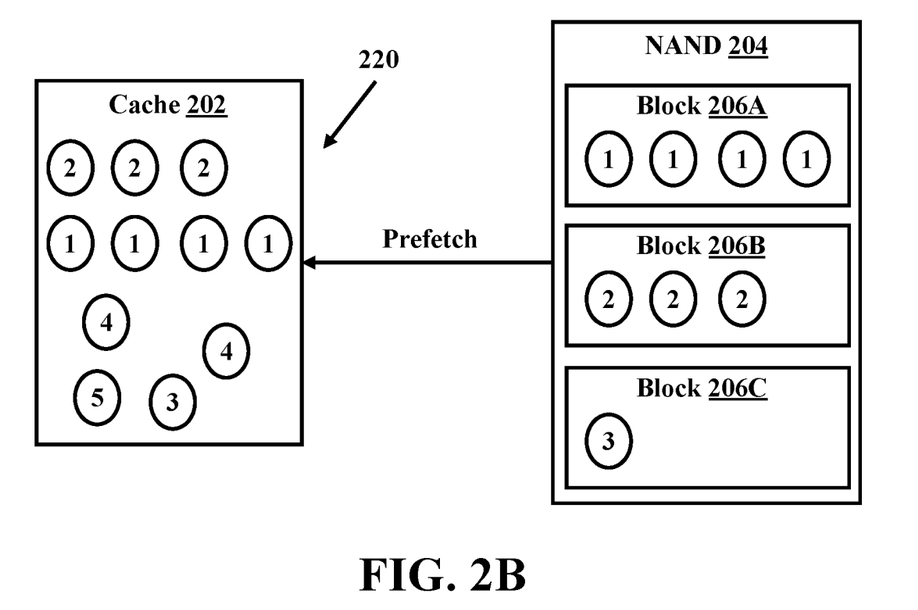
FIG. 2B illustrates an example of a prefetch by a non-volatile memory, in accordance with embodiments of the present disclosure.

Looking at FIG. 2B, illustrated is an example of a prefetch 220 by a non-volatile memory (e.g., NAND 204), in accordance with embodiments of the present disclosure. As depicted, there is a request for a memory chunk with app-tag 2 and then 1. Thus the NAND 204 prefetches any operations from the cache 202 with the same associated app-tags. It is noted that as depicted the cache 202 now has app-tags 4 and 5. In such an embodiment, they have not yet been saved to the NAND 204 and thus new blocks (e.g., blocks for app-tags 4 and 5) have not been generated/placed in the NAND 204.

Figure 3:
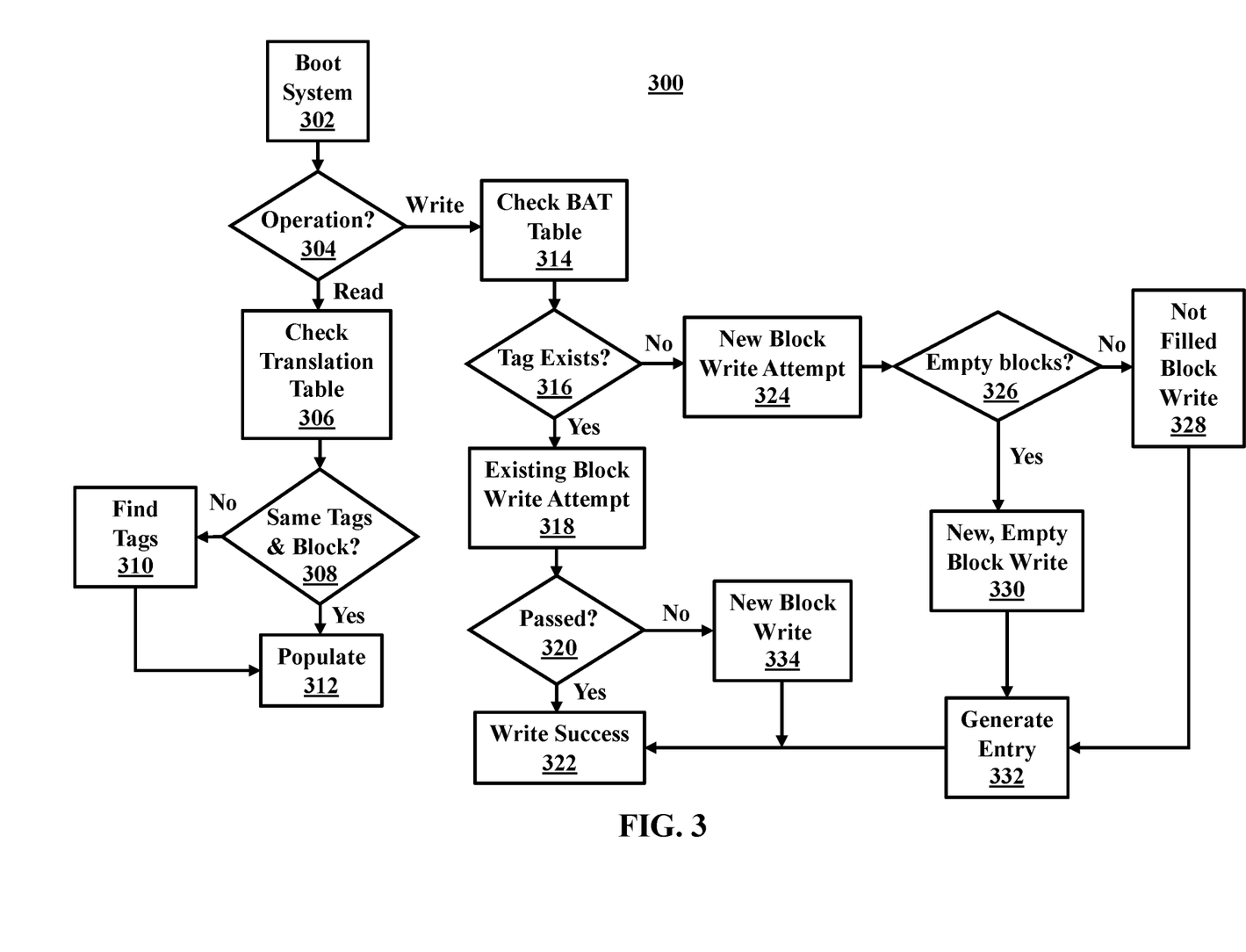
FIG. 3 illustrates a flowchart of an example method for prefetching random data using application tags, in accordance with embodiments of the present disclosure.

Turning now to FIG. 3, illustrate is a flowchart of an example method 300 for prefetching random data using application tags, in accordance with embodiments of the present disclosure. In some embodiments, the method 300 may be performed by a processor (e.g., in a system, controller, etc.). In some embodiments, the method 300 begins by the processor booting a system at operation 302.

In some embodiments, after booting the system, an operation request may be sent to/through the system. In some embodiments, the method 300 proceeds to decision block 304, where the processor determines a type of operation of data (of the request) based on an application tag. In some embodiments, the processor may analyze at least one specific table for the application tag and the processor may perform an operation (e.g., populate 312 or write success 322) associated with the application tag.

In some embodiments, determining the type of operation of data based on the application tag comprises the processor identifying that the type of operation of data is a red operation. In some embodiments, the method 300 then proceeds to operation 306, where the processor checks/analyzes a (NVM) translation table, e.g., a first specific table, where the table has a logical address key for a physical address, a block identification (ID), and an application tag.

In some embodiments, the method 300 proceeds to decision block 308, where it is determined by the processor if the application tag is available in a block of non-volatile memory. If the application tag is available in a block of non-volatile memory, the method 300 proceeds to operation 312, where the processor populates a prefetch buffer.

In some embodiments, the processor may identify that the application tag is not available in the block, e.g., it is determined at block 308 that the application tag is not available. In such an embodiment, the method 300 proceeds to operation 310, where the processor analyzes one or more other blocks in the non-volatile memory for the application using the translation table to find the application tag. In some embodiments, if/when the application tag is found at operation 310, the method proceeds to operation 312. In some embodiments, after operation 312, the method 300 may end.

In some embodiments, at decision block 304, it may be determined/identified that the type of operation of data is a write operation. In such an embodiment, the method 300 proceeds to operation 314, where the processor analyzes/checks a second specific table, e.g., a BAT table, for an application tag. In some embodiments, the method proceeds to decision block 316, where it is determined by the processor if the application tag exists in the second specific/BAT table. In some embodiments, the processor may provide a write success (e.g., 322 if the write attempt is completed; this will be discussed more fully below).

In some embodiments, at decision block 316, it may be identified/determined that the application tag does exist in the second specific/BAT table. In such an embodiment, the method 300 proceeds to operation 318, where the processor attempts to write into an existing block of non-volatile memory. In some embodiments, the method proceeds to decision block 320, where the processor determines if the write attempt passes/succeeds. In some embodiments, if the write attempt passes at decision block 320, the method 300 proceeds to operation 322, where a write success is provided to the system In some embodiments, if it is identified/determined that the write attempt does not pass at decision block 320, the method 300 proceeds to operation 334, where the processor writes into a new block of the non-volatile memory and the processor updates the second specific/BAT table with an entry indicating the new block being written. In some embodiments, after operation 334, the method proceeds to operation 322.

In some embodiments, if, at decision block 316, it is identified/determined that the application tag does not exist in the second specific/BAT table, the method 300 proceeds to operation 324, where the processor attempts to write into a new block of non-volatile memory. In some embodiments, the method 300 proceeds to decision block 326, where it is determined if one or more empty blocks are available.

In some embodiments, if it is identified/determined that there are one or more empty blocks at decision block 326, the method 300 proceeds to operation 330, where the processor writes into an empty block of the non-volatile memory. In some embodiments, the method 300 proceeds to operation 332, where the processor generates an entry in the second specific/BAT table with an application tag (associated with the write operation). In some embodiments, the method 300 proceeds to operation 322.

In some embodiments, at decision block 326, it may be identified/determined that there are not one or more empty blocks. In such an embodiment, the method 300 proceeds to operation 328, where the processor writes into a block that is not full. In some embodiments, the method 300 proceeds to operation 332 and then to operation 322. In some embodiments, the method 300 may end after operation 322.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
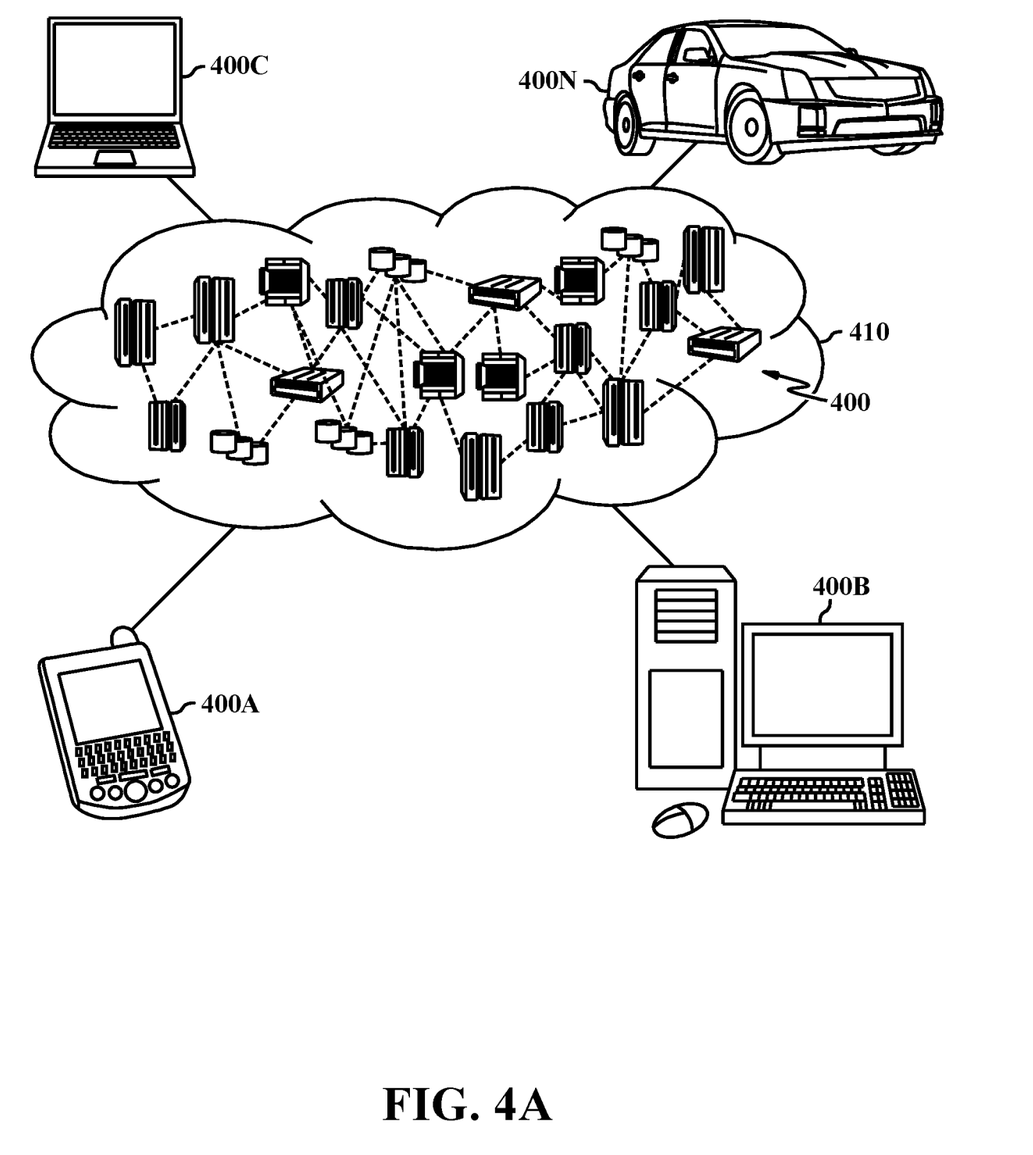
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
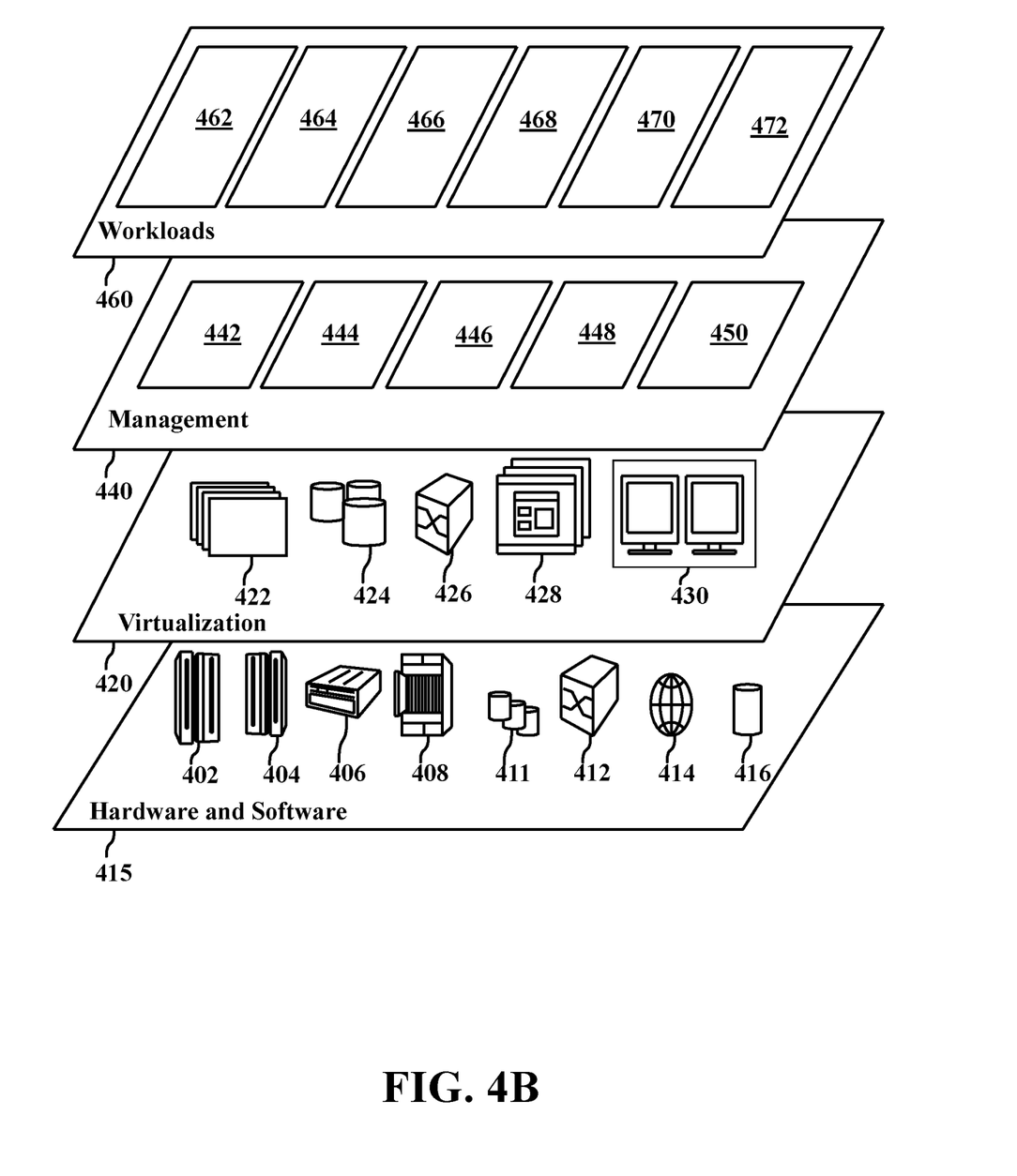
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and prefetching random data using application tags 472.

Figure 5:
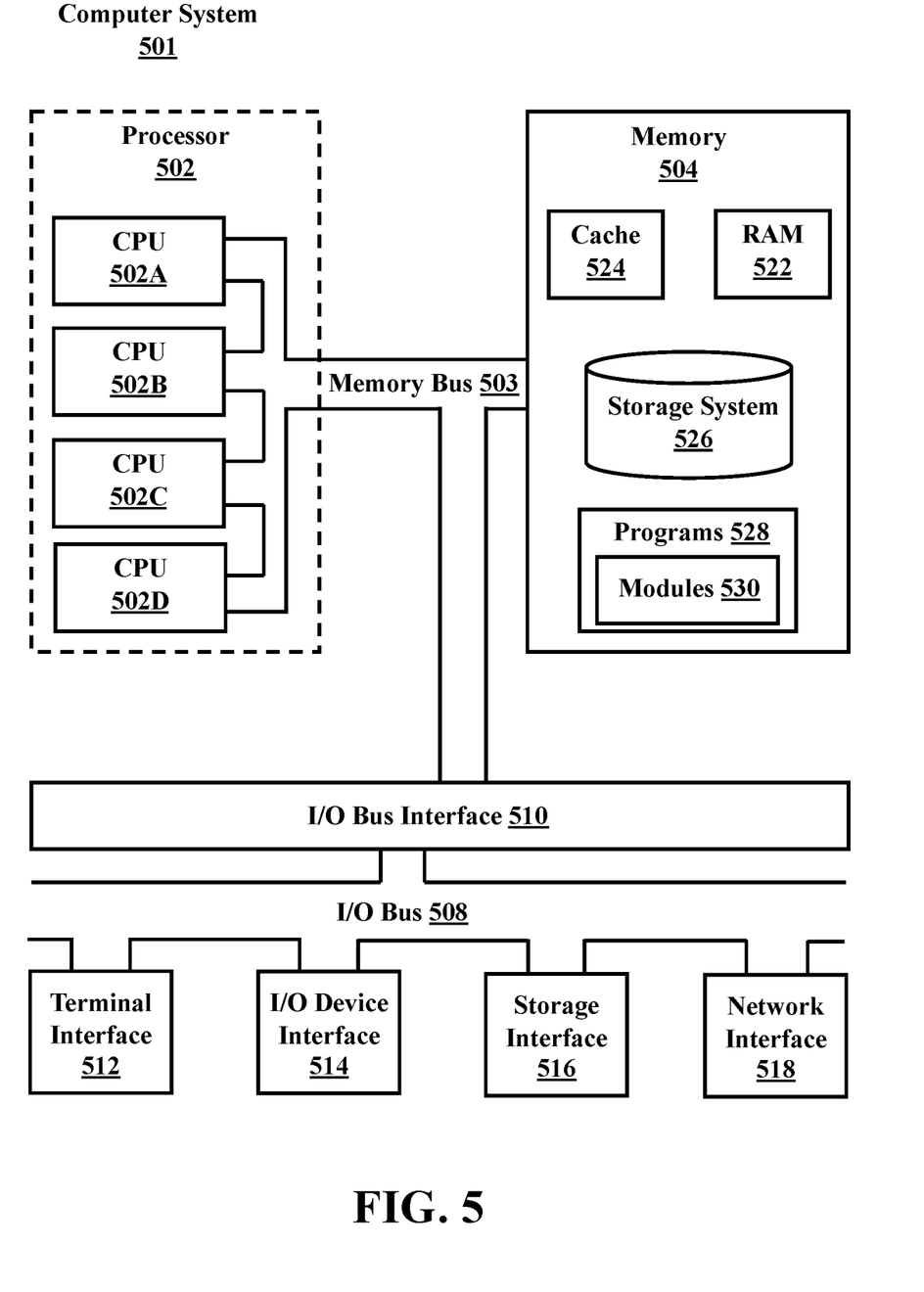
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for prefetching random data using application tags, the method comprising:
    booting, by a processor, a system;
    determining a type of operation of data based on an application tag;
    analyzing at least one specific table for the application tag;
    performing an operation associated with the application tag, wherein performing the operation includes performing the function of the operation, wherein the operation is either a read operation or a write operation.

2. The method of claim 1, wherein determining the type of operation of data based on the application tag comprises:
    identifying that the type of operation of data is a read operation;
    analyzing a first specific table with a logical address key for a physical address, a block identification (ID), and an application tag, wherein the first specific table is a translation table;
    determining if the application tag is available in a block of non-volatile memory; and
    populating a prefetch buffer.

3. The method of claim 2, wherein determining if the application tag is available in the block of the non-volatile memory includes:
    identifying that the application tag is not available in the block; and
    analyzing one or more other blocks in the non-volatile memory for the application tag.

4. The method of claim 1, wherein determining the type of operation of data based on the application tag comprises:
    identifying that the type of operation of data is a write operation;
    analyzing a second specific table for an application tag;
    determining if the application tag exists in the second specific table; and
    providing a write success.

5. The method of claim 4, wherein determining if the application tag exists includes:
    identifying that the application tag does exist in the second specific table;
    attempting to write into an existing block of non-volatile memory; and
    determining if the write attempt passes.

6. The method of claim 5, wherein determining if the write attempt passes includes:
    identifying that the write attempt did not pass;
    writing into a new block of the non-volatile memory; and
    updating the second specific table with an entry indicating the new block being written into.

7. The method of claim 4, wherein determining if the application tag exists includes:
    identifying that the application tag does not exist;
    attempting to write into a new block of non-volatile memory; and
    determining if one or more empty blocks are available.

8. The method of claim 7, wherein determining if the one or more empty blocks are available includes:
    identifying that there are one or more empty blocks;
    writing into an empty block; and
    generating an entry in the second specific table with an application tag.

9. The method of claim 7, wherein determining if the one or more empty blocks are available includes:
    identifying that there are not one or more empty blocks;
    writing into a block that is not full; and
    generating an entry in the second specific table with an application tag.

10. A computer program product for prefetching random data using application tags, the computer program product comprising a computer readable storage medium having program instructions embodied therewith, the program instructions executable by a processor to cause the processor to perform a function, the function comprising:
    booting, by the processor, a system;
    determining a type of operation of data based on an application tag;
    analyzing at least one specific table for the application tag;

performing an operation associated with the application tag, wherein performing the operation includes performing the function of the operation, wherein the operation is either a read operation or a write operation.

11. The computer program product of claim 10, wherein determining the type of operation of data based on the application tag comprises:
 identifying that the type of operation of data is a read operation;
 analyzing a first specific table with a logical address key for a physical address, a block identification (ID), and an application tag, wherein the first specific table is a translation table;
 determining if the application tag is available in a block of non-volatile memory; and
 populating a prefetch buffer.

12. A system for prefetching random data using application tags, the system comprising:
 a memory; and
 a processor in communication with the memory, the processor being configured to perform operations comprising:
 booting, by the processor, the system;
 determining a type of operation of data based on an application tag;
 analyzing at least one specific table for the application tag;
 performing an operation associated with the application tag, wherein performing the operation includes performing the function of the operation, wherein the operation is either a read operation or a write operation.

13. The system of claim 12, wherein determining the type of operation of data based on the application tag comprises:
 identifying that the type of operation of data is a read operation;
 analyzing a first specific table with a logical address key for a physical address, a block identification (ID), and an application tag, wherein the first specific table is a translation table;
 determining if the application tag is available in a block of non-volatile memory; and
 populating a prefetch buffer.

14. The system of claim 13, wherein determining if the application tag is available in the block of the non-volatile memory includes:
 identifying that the application tag is not available in the block; and
 analyzing one or more other blocks in the non-volatile memory for the application tag.

15. The system of claim 12, wherein determining the type of operation of data based on the application tag comprises:
 identifying that the type of operation of data is a write operation;
 analyzing a second specific table for an application tag;
 determining if the application tag exists in the second specific table; and
 providing a write success.

16. The system of claim 15, wherein determining if the application tag exists includes:
 identifying that the application tag does exist in the second specific table;
 attempting to write into an existing block of non-volatile memory; and
 determining if the write attempt passes.

17. The system of claim 16, wherein determining if the write attempt passes includes:
 identifying that the write attempt did not pass;
 writing into a new block of the non-volatile memory; and
 updating the second specific table with an entry indicating the new block being written into.

18. The system of claim 15, wherein determining if the application tag exists includes:
 identifying that the application tag does not exist;
 attempting to write into a new block of non-volatile memory; and
 determining if one or more empty blocks are available.

19. The system of claim 18, wherein determining if the one or more empty blocks are available includes:
 identifying that there are one or more empty blocks;
 writing into an empty block; and
 generating an entry in the second specific table with an application tag.

20. The system of claim 18, wherein determining if the one or more empty blocks are available includes:
 identifying that there are not one or more empty blocks;
 writing into a block that is not full; and
 generating an entry in the second specific table with an application tag.

* * * * *